(12) United States Patent
Heung et al.

(10) Patent No.: US 10,436,516 B2
(45) Date of Patent: Oct. 8, 2019

(54) THERMAL CYCLING DEVICE

(71) Applicant: Savannah River Nuclear Solutions, LLC, Aiken, SC (US)

(72) Inventors: Leung K. Heung, Aiken, SC (US); Henry T. Sessions, Jr., Aiken, SC (US); Xin Xiao, Augusta, GA (US); Sharon H. Redd, North Augusta, SC (US); David M. Immel, Augusta, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 989 days.

(21) Appl. No.: 13/974,525

(22) Filed: Aug. 23, 2013

(65) Prior Publication Data
US 2015/0053373 A1   Feb. 26, 2015

(51) Int. Cl.
*F28D 7/00* (2006.01)
*F28D 7/04* (2006.01)
*B01D 59/00* (2006.01)

(52) U.S. Cl.
CPC .......... *F28D 7/0016* (2013.01); *B01D 59/00* (2013.01); *F28D 7/04* (2013.01)

(58) Field of Classification Search
CPC ................................ F28D 7/0016; F28D 7/04
USPC ......... 219/530–535, 444.1; 165/58; 392/465, 392/472–484
See application file for complete search history.

(56) References Cited

U.S. PATENT DOCUMENTS

| | | |
|---|---|---|
| 1,786,000 A | 12/1930 | Bundy |
| 3,077,226 A | 2/1963 | Matheny |
| 3,411,574 A | 11/1968 | De Vries et al. |
| 3,711,601 A | 1/1973 | Reilly et al. |
| 4,336,226 A | 6/1982 | Christensen |
| 4,451,960 A | 6/1984 | Molitor |
| 4,495,989 A | 1/1985 | Sievers |
| 4,702,903 A | 10/1987 | Keefer |
| 4,758,721 A | 7/1988 | Hill |
| 4,859,427 A | 8/1989 | Konishi et al. |
| 4,883,117 A * | 11/1989 | Dobbs .................... F28D 7/0033 165/156 |
| 5,086,225 A | 2/1992 | Hill |
| 5,122,163 A | 6/1992 | Ide et al. |
| 5,312,597 A * | 5/1994 | Heung .................... C01B 3/508 422/159 |
| 5,505,829 A | 4/1996 | Villa-Aleman |
| 5,579,836 A | 12/1996 | Maruyama |
| 5,582,245 A | 12/1996 | Niimi |
| 5,713,216 A | 2/1998 | Erickson |
| 6,059,567 A | 5/2000 | Bolton et al. |
| 6,325,139 B1 | 12/2001 | Maruyama |

(Continued)

*Primary Examiner* — Ibrahime A Abraham
*Assistant Examiner* — Justin C Dodson
(74) *Attorney, Agent, or Firm* — Dority & Manning, P.A.

(57) ABSTRACT

Thermal cycling devices are provided. In one embodiment, a thermal cycling device includes a packed tube comprising an inlet portion defining an inlet and an outlet portion defining an outlet. The packed tube is provided in a double coil arrangement, wherein the double coil arrangement causes radially neighboring turns of the packed tube to have opposing flow directions therethrough. The thermal cycling device further includes a cooling device disposed axially adjacent to the packed tube, and a heating device disposed axially adjacent to the packed tube opposite the cooling device.

15 Claims, 4 Drawing Sheets

(56) References Cited

U.S. PATENT DOCUMENTS

| | | | |
|---|---|---|---|
| 6,432,174 B1* | 8/2002 | Heung | B01D 53/0462 |
| | | | 95/289 |
| 6,435,269 B1 | 8/2002 | Hancock | |
| 6,532,339 B1* | 3/2003 | Edgar | F24H 1/0045 |
| | | | 392/465 |
| 6,887,285 B2 | 5/2005 | Deshpande | |
| 7,165,605 B2 | 1/2007 | Park et al. | |
| 7,367,380 B2 | 5/2008 | Lee et al. | |
| 7,524,343 B2 | 4/2009 | Deshpande | |
| 7,927,464 B2 | 4/2011 | Gsell et al. | |
| 8,251,133 B2 | 8/2012 | Van Decker et al. | |
| 8,470,073 B2 | 6/2013 | Heung et al. | |
| 2002/0066726 A1* | 6/2002 | Cole, Sr. | G01R 31/2891 |
| | | | 219/444.1 |
| 2005/0142013 A1* | 6/2005 | Faries, Jr. | A61M 5/44 |
| | | | 417/477.2 |
| 2011/0011569 A1* | 1/2011 | Baker | F28D 7/0016 |
| | | | 165/165 |
| 2011/0107512 A1* | 5/2011 | Gilbert | E03C 1/00 |
| | | | 4/596 |

\* cited by examiner

THERMAL CYCLING DEVICE

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The present disclosure is related generally to thermal cycling devices, and more particularly to improvements in the column design of thermal cycling devices which may beneficially reduce heat loading and improve heat transfer.

BACKGROUND OF THE INVENTION

The separation of isotopes has a long history. Unlike other chemical separations, isotopes show minimal differences in reactivity toward other chemical entities. Diffusion separators and centrifugal separators have been demonstrated to be effective but their costs are prohibitive except for highly visible nuclear power and/or military projects.

The separation of element number 1, hydrogen, into its three isotopes, $^1H$ (protium or H), $^2H$ (deuterium or D), and $^3H$ (tritium or T) is important for studies in chemical kinetics and in medicine. The chemical properties of H, D, and T are essentially the same except for weight and equilibrium constants. The separation is made more difficult by the fact that the elements are normally found as the diatomic molecule and may exist in six different possible relationships.

Certain metal hydrides have been used for the storage of hydrogen and for the separation of the H, D, and T isotopes and these metals include vanadium, palladium, and uranium. U.S. Pat. No. 3,711,601 to Reilly et al. discloses a process for the use of vanadium hydride to concentrate and recover heavy hydrogen isotopes. U.S. Pat. No. 4,336,226 to Christensen discloses a vanadium hydride gas generator to provide a D, T gas mixture in a pressurized chamber wherein the pressure is controlled by regulating the temperature of the high-pressure chamber.

U.S. Pat. No. 5,122,163 to Ide et al. discloses a method for isotope separation of gaseous isotopes in a thermal diffusion column having a hot wall and a cold wall.

U.S. Pat. No. 4,702,903 to Keefer discloses separating components of a gas mixture by thermal swing adsorption and/or pressure swing adsorption inside a Stirling cycle apparatus and absorbent bed.

U.S. Pat. Nos. 4,758,721 and 5,086,225 to Hill discloses isotope separation using thermal cycling in the context of a mass spectrometer. The objective is the concentration of iodine-123 for medical uses.

U.S. Pat. No. 4,859,427 to Konishi et al. discloses hydride-containing columns arranged in parallel within a sealed housing wherein heat is supplied by applying an electric current to heating coils within the housing. The reference attempts to address the problem of changes in the mechanical strength of the metal hydride as a result of generation of hydrogen gas by introducing a series of filters to maintain the integrity of the column.

U.S. Pat. No. 5,312,597 to Heung discloses an apparatus for separating and recovering hydrogen isotopes using a coil in a cylindrical housing as the separation column and externally supplied heating or cooling gases which alternatively heat and cool the column. The invention is particularly characterized by the use of an internal baffle to minimize the mass of the heating/cooling gas for a more rapid cycle time.

U.S. Pat. No. 5,505,829 to Villa-Aleman discloses an apparatus for the separation of the gaseous isotopes H, D, and T using molecular sieves. The apparatus is jacketed for cooling and the temperature of the mol sieves is cycled using microwave energy.

The efficiency of any process using thermal cycling or "thermal swing adsorption" depends upon the rate at which the temperature can be raised and lowered to the optimal upper and lower operating temperatures. The prior art is characterized by low switching rates and by cumbersome supporting equipment and improvement has been long sought without success.

Accordingly, improved thermal cycling devices are desired in the art. Particularly, thermal cycling devices which provide improved heat transfer as well as reduced heat loading would be advantageous. Further, thermal cycling devices which provide such improvements while requiring less cumbersome supporting equipment are desired.

BRIEF DESCRIPTION OF THE INVENTION

Aspects and advantages of the invention will be set forth in part in the following description, or may be apparent from the description, or may be learned through practice of the invention.

In accordance with one embodiment, the present disclosure is directed to a thermal cycling device. The thermal cycling device includes a packed tube comprising an inlet portion defining an inlet and an outlet portion defining an outlet. The packed tube is provided in a double coil arrangement, wherein the double coil arrangement causes radially neighboring turns of the packed tube to have opposing flow directions therethrough. The thermal cycling device further includes a cooling device disposed axially adjacent to the packed tube, and a heating device disposed axially adjacent to the packed tube opposite the cooling device.

In another embodiment, the present disclosure is directed to a thermal cycling device. The thermal cycling device includes a packed tube, a cooling tube disposed axially adjacent to the packed tube, and a heating wire disposed axially adjacent to the packed tube opposite the cooling tube. Each of the packed tube, the cooling tube, and the heating wire is provided in a double coil arrangement, wherein the double coil arrangement causes radially neighboring turns of each of the packed tube, the cooling tube, and the heating wire to have opposing flow directions therethrough.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to improved thermal cycling devices which generally provide reductions in heat loading and improvements in heat transfer, thus resulting in generally shorter cycle times, for thermal cycling absorption processes. The present thermal cycling devices provide an improved column design which eliminates the requirement for a jacket surrounding the column and associated hot and cold circulation systems. Further, the present thermal cycling devices provide reduced footprints, reducing the requirement for cumbersome supporting equipment.

In general, such improvements are provided through the use of a packed tube as the column of the device. The packed tube is generally provided in a double coil arrangement which causes radially neighboring turns of the packed tube to have opposing flow directions therethrough. Such arrangement reduces the footprint of the device and generally increases heat transfer. In exemplary embodiments, associated cooling devices and heating devices may have similar double coil arrangements, thus further reducing the footprint of the device and generally increasing heat transfer. Such cooling devices and heating devices may be positioned on opposing sides of the packed tube, and may for example be operated in an alternating fashion to alternatively heat and cool the packed tube and contents thereof.

Figure 1:
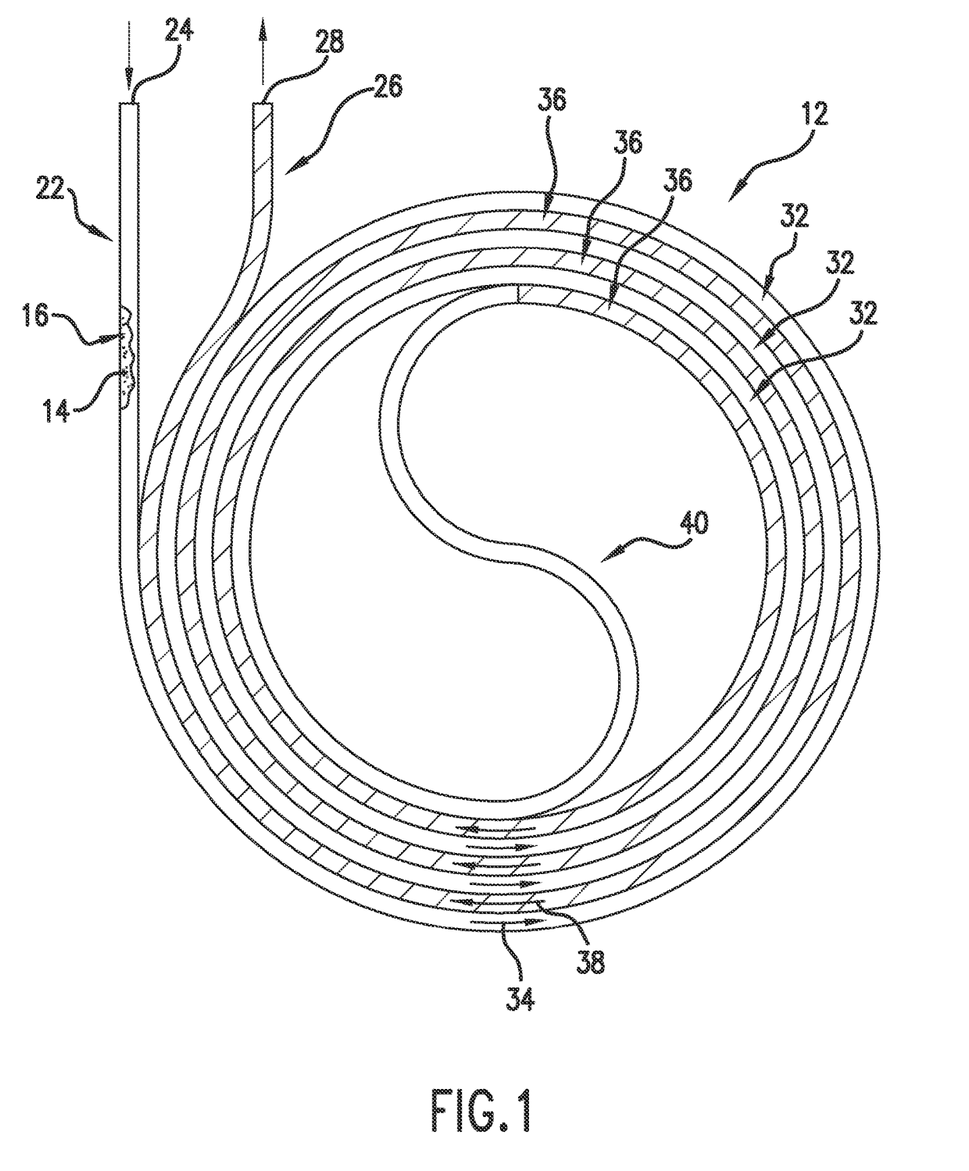
FIG. 1 provides a front view of a packed tube of a thermal cycling device in accordance with one embodiment of the present disclosure.
Figure 2:
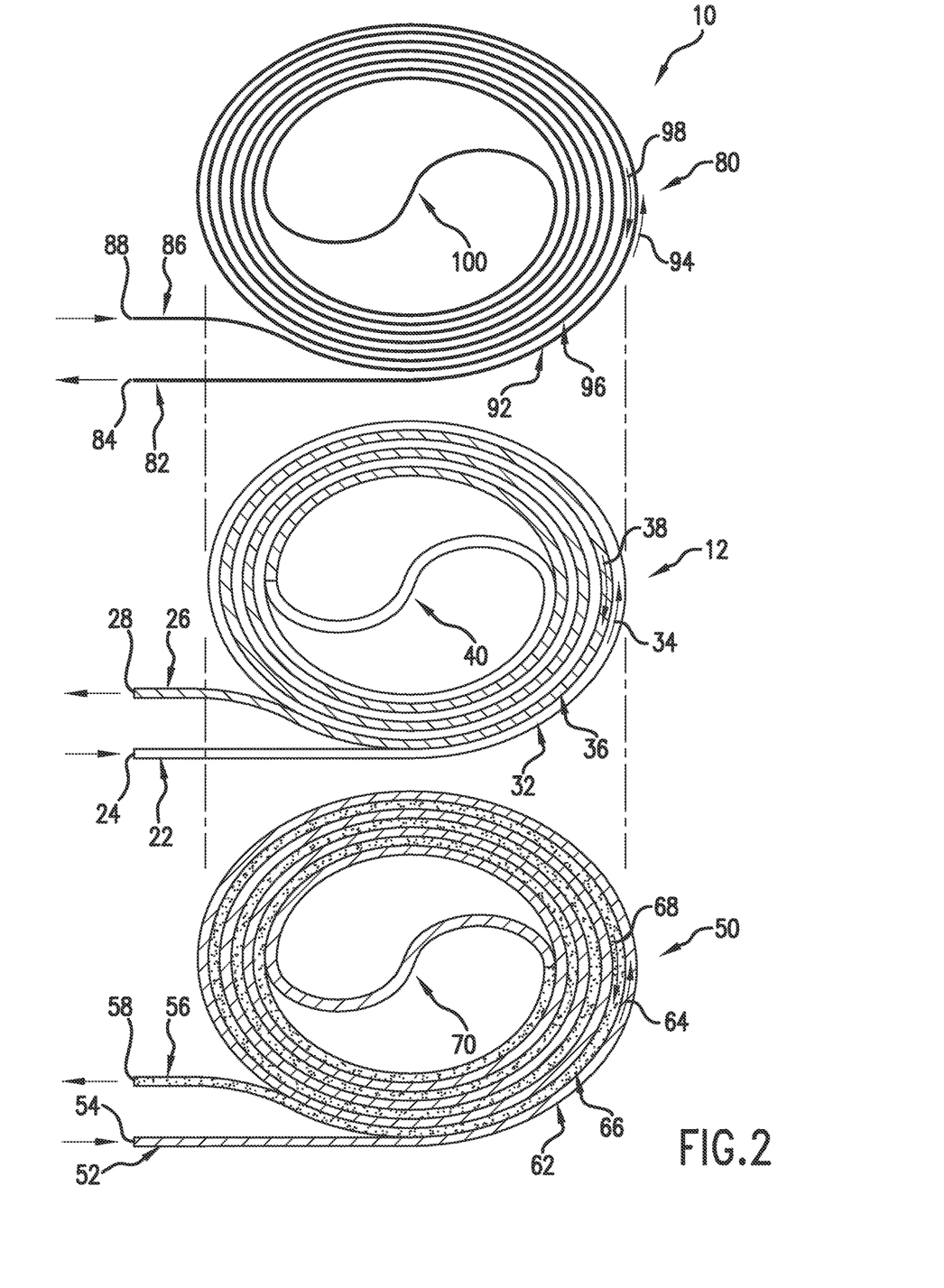
FIG. 2 provides an exploded perspective view of a thermal cycling device in accordance with one embodiment of the present disclosure.
Figure 3:
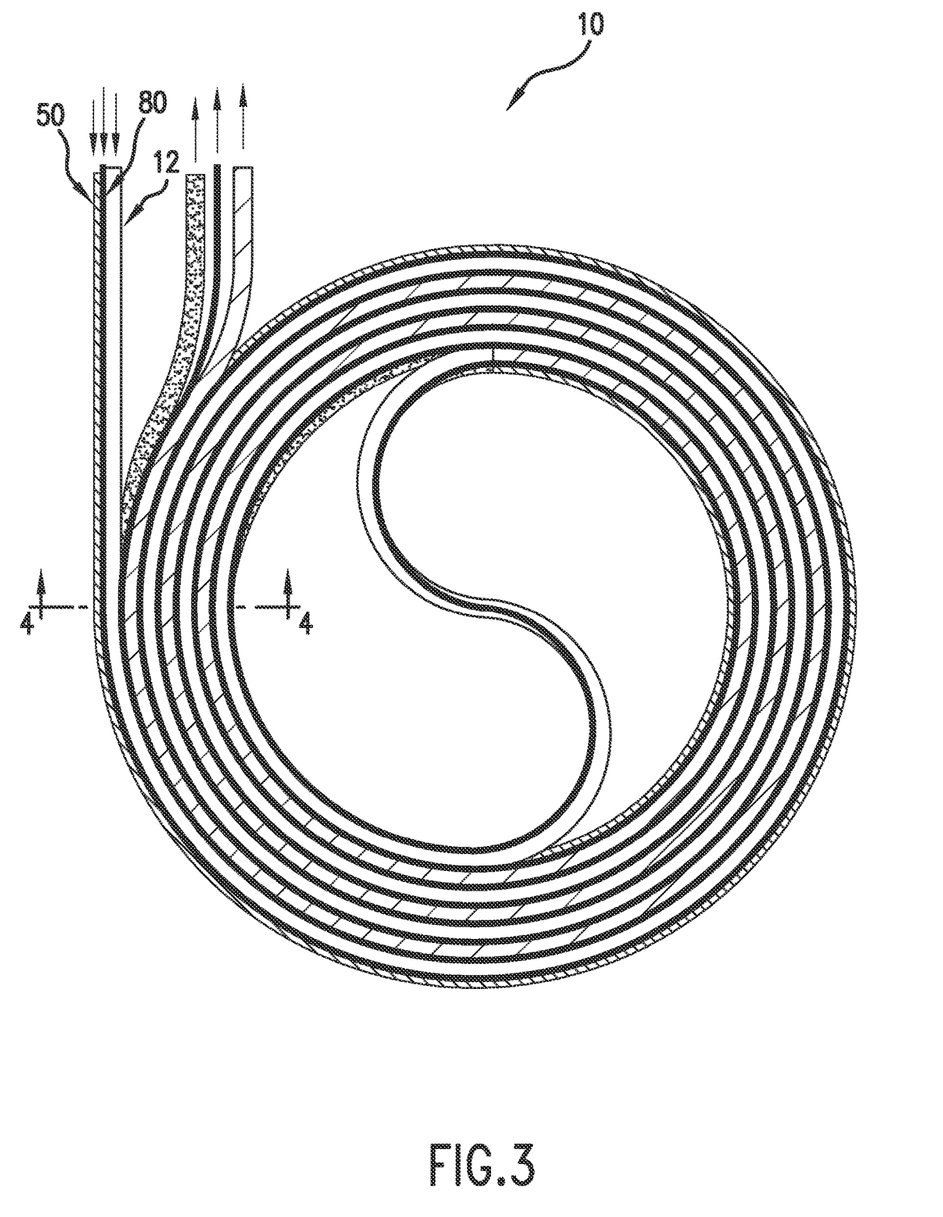
FIG. 3 provides a front view of a thermal cycling device in accordance with one embodiment of the present disclosure.

Referring now to FIGS. 1 and 2, a thermal cycling device 10 may include a packed tube 12. The packed tube 12 may generally serve as the column of the device, in which separation is performed. For example, in exemplary embodiments, hydrogen may flow through the packed tube 12, and may be separated as required into H, D and T isotopes. Thus, hydrogen and/or any suitable mixture of H, D and T may flow through the packed tube 12. Alternatively, however, a device 10 may be utilized for any suitable thermal cycling process using any suitable elements and resulting associated isotopes.

The packed tube 12 may generally include a packing material 14 disposed within an interior 16 of the tube 12. The packing material may, for example, be metal hydride, palladium deposited on kieselguhr ("Pd/k"), molecular sieve, and/or any other suitable packing material as required for a desired element and application.

The packed tube 12 may generally be formed from a suitable metal, such as in exemplary embodiments stainless steel or, alternatively, aluminum. Alternatively, the packed tube 12 may be formed from any suitable material.

As shown, a packed tube 12 according to the present disclosure may be provided in a double coil arrangement. Such arrangement results in, as shown, the packed tube 12 being coiled such that it includes a plurality of radially adjacent turns. These turns of the tube 12 may in exemplary embodiments be in contact with one another. As shown in FIG. 1, radially neighboring turns may have opposing flow directions therethrough.

For example, a packed tube 12 may include an inlet portion 22, which may define an inlet 24 of the tube 12, and an outlet portion 26, which may define an outlet portion 28 of the tube 12. The inlet portion 22 and outlet portion 26 may be defined by the adjacent turns of the tube 12 when in the double coil arrangement. Thus, turn 32 of the inlet portion 22 may alternate radially with turns 36 of the outlet portion 26. It should be understood that the inlet portion and outlet portion of a tube 12 as described herein are merely different portions of a singular tube 12 which have any suitable size and/or shape and which together define the overall length of the tube 12. FIG. 1 illustrates the inlet portion 22 without cross-hatching and the outlet portion 26 with cross-hatching merely to define the respective portions for illustrative purposes only.

As discussed, due to the double coil arrangement, radially neighboring turns may have opposing flow directions therethrough. Thus, as illustrated in FIG. 1, a flow direction 34 of a fluid, such as hydrogen, through an inlet turn 32 may be opposite to a flow direction 38 of the fluid through an outlet turn 36 when viewed in the double coil arrangement as shown. It should be understood, of course, that such flow directions are merely due to the arrangement of the tube 12, and further that the flow directions may switch directions as required during operation of the device 10.

The double coil arrangement of the tube 12 may thus advantageously facilitate increased heat transfer, due to the contact between and opposing flows through the various turns of the tube 12. Further, by providing the tube 12 in a double coil arrangement, the area taken up by the tube 12 may be reduced, because the coil can be wound relatively tightly, having a minimal radius.

As further shown in FIG. 1, a tube 12 according to the present disclosure may include a generally S-shaped portion 40. The S-shaped portion 40 may be a part of one of the inlet portion 22 or the outlet portion 26, and may connect that portion 22, 26 with the other portion 26, 22. For example, as shown in FIG. 1, an S-shaped portion 40 on the inlet portion 22 connects with the outlet portion 26 at a location of initial contact between an outlet turn 36 and an inlet turn 32. The S-shaped portion 40 may facilitate the creation of the double coil arrangement, and allow the opposing flow directions through neighboring turns as discussed above. It should be understood, however, that the present disclosure is not limited to the use of S-shaped portions, and rather that any suitable double coil arrangements are within the scope and spirit of the present disclosure.

Referring now to FIGS. 2 through 5, a device 10 according to the present disclosure may further include a cooling device disposed axially adjacent to the packed tube 12. The cooling device is in exemplary embodiments in either direct or indirect contact with the tube 12, thus facilitating heat transfer between the cooling device and tube 12. Any suitable cooling device, which may be operated to provide relatively cool temperatures to the tube 12, are within the scope and spirit of the present disclosure.

In some exemplary embodiments, as shown, the cooling device 50 may be a cooling tube 50. The cooling tube 50 may, similar to the packed tube 12, be provided in a double coil arrangement as shown. Thus, the cooling tube 50 may include a plurality of radially adjacent turns. These turns of the tube 50 may in exemplary embodiments be in contact with one another. As shown, radially neighboring turns may have opposing flow directions therethrough.

For example, similar to the packed tube 12, a cooling tube 50 may include an inlet portion 52, which may define an inlet 54 of the tube 50, and an outlet portion 56, which may define an outlet portion 58 of the tube 50. The inlet portion 52 and outlet portion 56 may be defined by the adjacent turns of the tube 50 when in the double coil arrangement. Thus, turn 62 of the inlet portion 52 may alternate radially with turns 66 of the outlet portion 56.

Further, similar to the packed tube 12 and due to the double coil arrangement, radially neighboring turns of the tube 50 may have opposing flow directions therethrough. Thus, as illustrated, a flow direction 64 of a fluid, such as nitrogen, through an inlet turn 62 may be opposite to a flow direction 68 of the fluid through an outlet turn 66 when viewed in the double coil arrangement as shown.

The double coil arrangement of the tube 50 may thus advantageously facilitate increased heat transfer, due to the contact between and opposing flows through the various turns of the tube 50. Further, by providing the tube 50 in a double coil arrangement, the area taken up by the tube 50 may be reduced, because the coil can be wound relatively tightly, having a minimal radius.

As further shown, a tube 50 according to the present disclosure may include a generally S-shaped portion 70. The S-shaped portion 70 may be a part of one of the inlet portion 52 or the outlet portion 56, and may connect that portion 52, 56 with the other portion 56, 52. For example, an S-shaped portion 70 on the inlet portion 52 may connect with the outlet portion 56 at a location of initial contact between an outlet turn 66 and an inlet turn 62. The S-shaped portion 70 may facilitate the creation of the double coil arrangement, and allow the opposing flow directions through neighboring turns as discussed above.

A cooling tube 50 according to the present disclosure may generally be formed from a suitable metal, such as in exemplary embodiments stainless steel or, alternatively, aluminum. Alternatively, a cooling tube 50 may be formed from any suitable material.

Further, any suitable cooling medium may be flowed through a cooling tube 50 according to the present disclosure. For example, in some exemplary embodiments, nitrogen may flow through a cooling tube 50. It should be noted that nitrogen may be in gas form, liquid form, or a gas-liquid combination. Alternatively, any suitable fluid is within the scope and spirit of the present disclosure.

Referring still to FIGS. 2 through 5, a device 10 according to the present disclosure may further include a heating device disposed axially adjacent to the packed tube 12 opposite the cooling device. The heating device is in exemplary embodiments in either direct or indirect contact with the tube 12, thus facilitating heat transfer between the heating device and tube 12. Any suitable heating device, which may be operated to provide relatively hot temperatures to the tube 12, are within the scope and spirit of the present disclosure.

In some exemplary embodiments, as shown, the heating device 80 may be a heating wire 80. The heating wire 80 may, similar to the packed tube 12, be provided in a double coil arrangement as shown. Thus, the heating wire 80 may include a plurality of radially adjacent turns. These turns of the heating wire 80 may in exemplary embodiments be in contact with one another. As shown, radially neighboring turns may have opposing flow directions therethrough.

For example, similar to the packed tube 12, a heating wire 80 may include an inlet portion 82, which may define an inlet 84 of the heating wire 80, and an outlet portion 86, which may define an outlet portion 88 of the heating wire 80. The inlet portion 82 and outlet portion 86 may be defined by the adjacent turns of the heating wire 80 when in the double coil arrangement. Thus, turn 92 of the inlet portion 82 may alternate radially with turns 96 of the outlet portion 86.

Further, similar to the packed tube 12 and due to the double coil arrangement, radially neighboring turns of the heating device may have opposing flow directions therethrough. Thus, as illustrated for a heating wire 80, a flow direction 94 of an electrical current through an inlet turn 92 may be opposite to a flow direction 98 of the current through an outlet turn 96 when viewed in the double coil arrangement as shown.

In some embodiments, the double coil arrangement of the heating device may thus advantageously facilitate increased heat transfer, due to the contact between and opposing flows through the various turns of the heating device. In particular, such increased heat transfer may be facilitated in alternative embodiments wherein the heating device is a tube flowing a heating fluid therethrough. Further, by providing the heating device in a double coil arrangement, the area taken up by the heating device may be reduced, because the device can be wound relatively tightly, having a minimal radius.

As further shown, a heating wire 80 according to the present disclosure may include a generally S-shaped portion 100. The S-shaped portion 100 may be a part of one of the inlet portion 82 or the outlet portion 86, and may connect that portion 82, 86 with the other portion 86, 82. For example, an S-shaped portion 100 on the inlet portion 82 may connect with the outlet portion 86 at a location of initial contact between an outlet turn 96 and an inlet turn 92. The S-shaped portion 100 may facilitate the creation of the double coil arrangement, and allow the opposing flow directions through neighboring turns as discussed above.

A heating wire 80 according to the present disclosure may generally be formed from a suitable electrically conductive material which emits heat due to electrical current being run therethrough.

Figure 4:
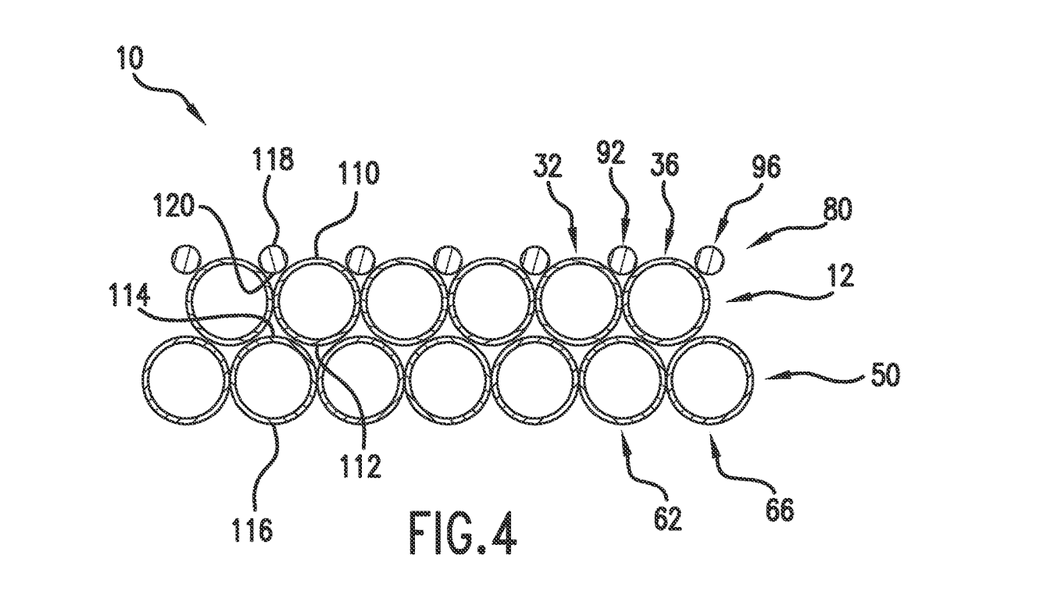
FIG. 4 provides a cross-sectional view, along the lines 4-4 of FIG. 3, of a thermal cycling device in accordance with one embodiment of the present disclosure.
Figure 5:
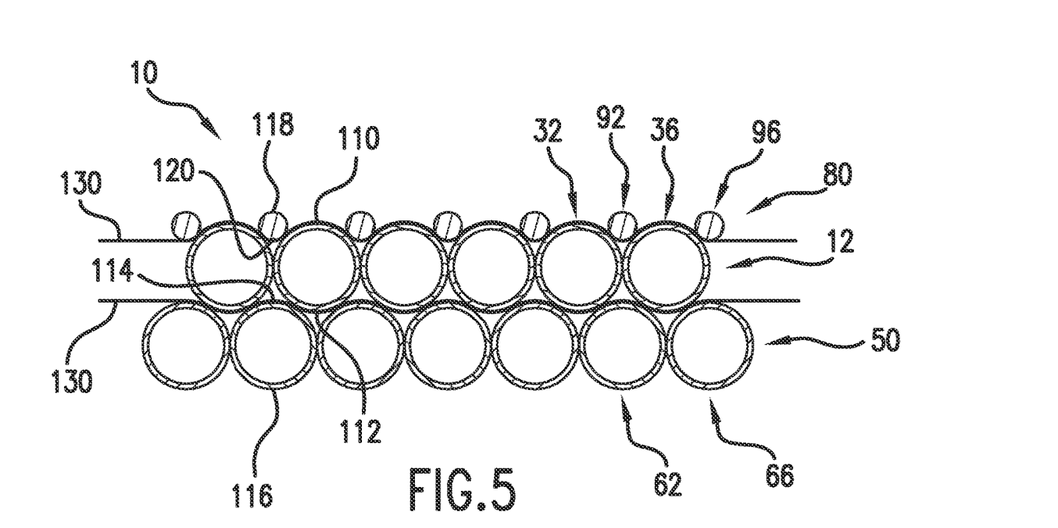
FIG. 5 provides a cross-sectional view of a thermal cycling device in accordance with another embodiment of the present disclosure.

Referring now to FIGS. 4 and 5, the packed tube 12, cooling device, and heating device of the present disclosure may in some embodiments each define a peak and a trough. A peak is generally a high point on the tube or device, when viewed in a cross-sectional or end-wise view as shown. A trough is generally a corresponding low point. In embodiments wherein the cooling device is a cooling tube 50 and the heating device is a heating wire 80, and wherein each tube 12, 50 and wire 80 is provided in a double coil arrangement, the peak and trough of each may be viewed at multiple separate locations, such as on each turn of the tube 12, 50 and wire 80. FIGS. 4 and 5 thus illustrate the peak 110 and trough 112 of the packed tube 12, the peak 114 and trough 116 of the cooling tube 50, and the peak 118 and trough 120 of the heating wire 80.

In exemplary embodiments, as shown, the packed tube 12, cooling device, and heating device may be offset from one another, when viewed in a cross-sectional or end-wise view as shown. Such offsets may further facilitate heat transfer between the packed tube 12, cooling device, and heating device during operation, due to the increased proximity of the packed tube 12, cooling device, and heating device. As shown, for example, the peak 110 and trough 112 of the packed tube 12 may be offset from the peaks 114, 118 and troughs 116, 120 of the respective cooling device and heating device.

As discussed above, the packed tube 12, cooling device, and heating device of the present disclosure may in exemplary embodiments be in direct or indirect contact. FIG. 4 illustrates these components in direct contact, wherein portions of the packed tube 12 touch the cooling device and the heating device. Alternatively, as illustrated in FIG. 5, these components may be in indirect contact. For example, heat exchange sheets 130 may be provided, and may be disposed between, the packed tube 12 and cooling device and/or the packed tube 12 and heating device. The packed tube 12, cooling device and/or heating device may contact the heat exchange sheets 130, such that indirect contact is defined through the heat exchange sheets 130 as shown. Such heat exchange sheets 130 may further facilitate heat transfer by relatively evenly distributing heat from the heating device and cold temperatures from the cooling device. In exemplary embodiments, a heat exchange sheet 130 may be formed from aluminum, such as from aluminum foil. Alternatively, any suitable heat conductive material, such as a suitable metal, is within the scope and spirit of the present disclosure.

The packed tube 12, cooling device, and heating device may each be held in shape, such as in the double coil arrangement as discussed above, using any suitable fastening means. For example, in some embodiments, neighboring turns of a packed tube 12, cooling tube 50, and/or heating wire 80 (or other suitable cooling device and/or heating device) may be brazed and/or annealed or otherwise heat treated such that they are fastened together. Such fastening may improve turn contact and further facilitate heat transfer and heat distribution. Alternatively, suitable mechanical fasteners may be utilized. Additionally, the heating device and cooling device may be fastened to the packed tube 12 using any suitable fastening means. For example, the cooling device and/or heating device may be brazed and/or annealed or otherwise heat treated to the packed tube 12. Such fastening may improve turn contact and further facilitate heat transfer and heat distribution. Alternatively, suitable mechanical fasteners may be utilized.

It should be noted that, in exemplary embodiments, the packed tube 12, cooling device, and heating device are arranged and fastened together in generally identical planes, as shown, to facilitate stacking and heat transfer therebetween. It should additionally be noted that each of the packed tube 12, cooling device, and heating device are self-contained and self-feeding, such that each may be replaced as required separate from the others.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A thermal cycling device for hydrogen isotope separation, comprising:
   a packed tube having a circular cross-sectional profile and comprising an interior, an inlet portion defining an inlet, and an outlet portion defining an outlet, the packed tube provided in a double coil arrangement, wherein the double coil arrangement of the packed tube includes a plurality of radially adjacent turns residing within a single plane of the packed tube, the radially adjacent turns having opposing flow directions of hydrogen therethrough during thermal cycling, wherein the inlet portion has a plurality of turns of the radially adjacent turns and the outlet portion has a plurality of turns of the radially adjacent turns, with multiple of the plurality of turns of the inlet portion each individually positioned between and in contact with radially adjacent turns of the outlet portion and multiple of the plurality of turns of the outlet portion each individually positioned between and in contact with radially adjacent turns of the inlet portion such that individual radially neighboring turns of the packed tube have opposing flow directions of hydrogen therethrough during thermal cycling,
   a packing material located in the interior of the packed tube, the packing material configured for separation of hydrogen isotopes flowing through the packing material within the packed tube;
   a cooling device disposed on a first side of the packed tube along an axial direction, and thermally connected to, the packed tube, wherein the cooling device is a cooling tube, the cooling tube comprising an inlet portion defining an inlet and an outlet portion defining an outlet, the cooling tube provided in a double coil arrangement that includes a plurality of radially adjacent turns residing within a single plane of the cooling device, wherein the inlet portion of the cooling device has at least one turn of the radially adjacent turns of the inlet portion positioned between radially adjacent turns of the outlet portion of the cooling device and the outlet portion of the cooling device has at least one turn of the radially adjacent turns of the outlet portion positioned between radially adjacent turns of the inlet portion of the cooling device, wherein the double coil arrangement causes radially neighboring turns of the cooling tube to have opposing flow directions of cooling fluid therethrough during thermal cycling; and
   a heating device provided in a double coil arrangement with radially adjacent turns residing in a single plane of the heating device, the heating device disposed on a second side of the packed tube along the axial direction, and thermally connected to, the packed tube opposite the cooling device,
   wherein the radially adjacent turns of each of the packed tube, the cooling device, and the heating device each define peaks and troughs, wherein the packed tube peaks are above the heating device troughs and the packed tube troughs are below the cooling device peaks along a longitudinal axis, the longitudinal axis perpendicular to the radial direction.

2. The thermal cycling device of claim 1, wherein the plurality of radially adjacent turns of the cooling device are in physical contact with one another.

3. The thermal cycling device of claim 1, wherein the heating device is a heating wire, the heating wire comprising an inlet portion defining an inlet and an outlet portion defining an outlet, the heating wire provided in a double coil arrangement.

4. The thermal cycling device of claim 1, wherein the inlet portion of the packed tube comprises an S-shaped portion, the S-shaped portion connecting to the outlet portion of the packed tube.

5. The thermal cycling device of claim 1, wherein the radially adjacent turns of the packed tube are in contact with the radially adjacent turns of the cooling device.

6. The thermal cycling device of claim 1, wherein the peaks and troughs of the packed tube are offset radially from the peaks and troughs of the cooling device and the heating device.

7. The thermal cycling device of claim 1, further comprising a heat exchange sheet disposed between the packed tube and the cooling device and between the packed tube and the heating device.

8. The thermal cycling device of claim 1, wherein the packed tube and the cooling device are formed from stainless steel.

9. The thermal cycling device of claim 1, wherein the cooling fluid flowing through the cooling device is-nitrogen flowing through the cooling device.

10. The thermal cycling device of claim 1, wherein the outlet portion of the packed tube comprises an S-shaped portion, the S-shaped portion connecting to the inlet portion of the packed tube.

11. The thermal cycling device of claim 1, wherein radially-adjacent turns of the packed tube comprises turns of the inlet portion of the packed tube alternating with turns of the outlet portion of the packed tube.

12. The thermal cycling device of claim 5, wherein the radially adjacent turns of the packed tube are in contact with the radially adjacent turns of the heating device.

13. The thermal cycling device of claim 12, wherein radially-adjacent turns of the packed tube comprises turns of the inlet portion of the packed tube alternating with turns of the outlet portion of the packed tube.

14. A thermal cycling device for isotope separation, comprising:
  a packed tube having a circular cross-sectional profile and provided in a double coil arrangement of radially adjacent turns that reside within a single plane of the packed tube and alternate repeatedly between an inlet portion of the packed tube and an outlet, portion of the packed tube, with multiple inlet portion turns of the radially adjacent turns each individually positioned between and in contact with radially adjacent turns of the outlet portion and multiple outlet portion turns of the radially adjacent turns each individually positioned between and in contact with radially adjacent turns of the inlet portion such that individual radially neighboring turns of the packed tube have opposing flow directions of hydrogen therethrough during thermal cycling;
  a packing material positioned within the packed tube that is configured for separation of hydrogen isotopes flowing through the packing material during thermal cycling;
  a cooling tube disposed on a first side of the packed tube along an axial direction and provided in a double coil arrangement of radially adjacent turns that reside within a single plane of the cooling tube and alternate repeatedly between an inlet portion of the cooling tube and an outlet portion of the cooling tube, wherein the radially adjacent turns of the cooling tube are arranged so that fluid flows in opposing directions between the radially adjacent turns of the cooling tube during thermal cycling, and
  a heating device disposed on a second side of the packed tube along the axial direction such that the packed tube is located axially between the heating device and the cooling tube, the heating device provided in a double coil arrangement of radially adjacent turns,
  wherein the radially adjacent turns of each of the packed tube, the cooling tube, and the heating device each define peaks and troughs, wherein the packed tube peaks are above the heating device troughs and the packed tube troughs are below the cooling device peaks along a longitudinal axis, the longitudinal axis perpendicular to the radial direction.

15. The thermal cycling device of claim 14, wherein the radially adjacent turns of the heating device reside in a single plane of the heating device.

\* \* \* \* \*